W. F. BEATTY.
GAME BOARD.
APPLICATION FILED DEC. 12, 1911.
1,046,544.
Patented Dec. 10, 1912.
2 SHEETS—SHEET 1.
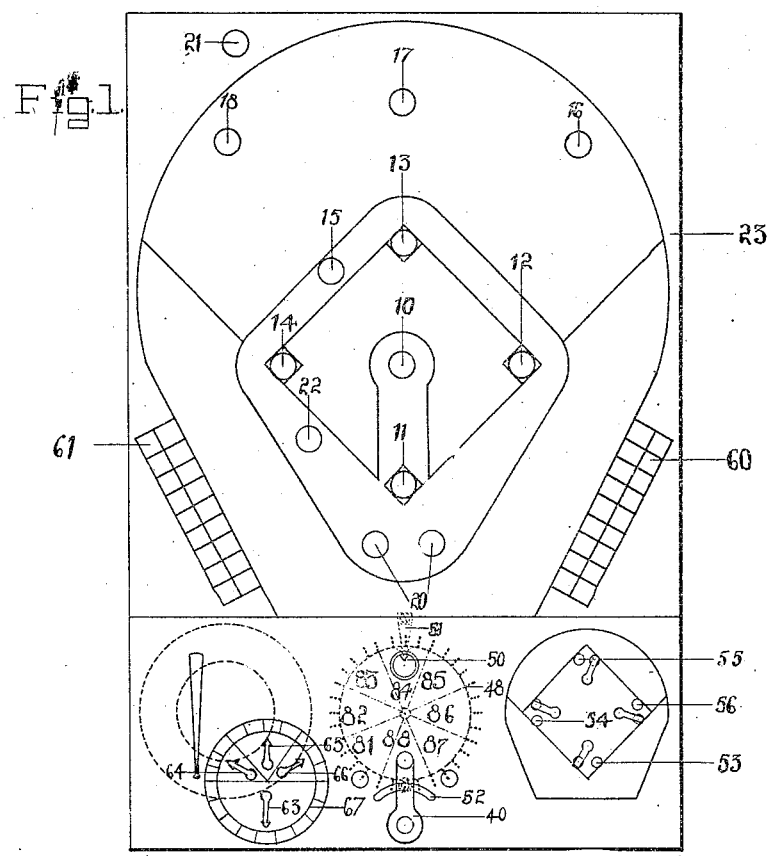
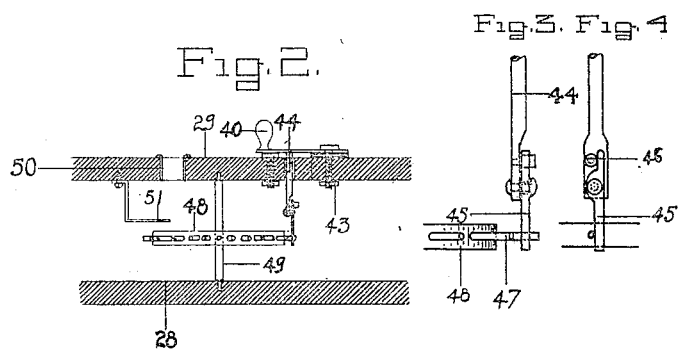
Witnesses:
John Murtagh
L. J. Murphy
Inventor
William Francis Beatty
By his Attorneys
Goepel & Goepel.

W. F. BEATTY.
GAME BOARD.
APPLICATION FILED DEC. 12, 1911.

1,046,544.

Patented Dec. 10, 1912.

2 SHEETS—SHEET 2.

Witnesses:
John Murtagh
L. J. Murphy

Inventor
William Francis Beatty
By his Attorneys
Loefer & Goepel

UNITED STATES PATENT OFFICE.

WILLIAM FRANCIS BEATTY, OF LAUREL HILL, NEW YORK.

GAME-BOARD.

1,046,544.  Specification of Letters Patent.  Patented Dec. 10, 1912.

Application filed December 12, 1911. Serial No. 665,253.

*To all whom it may concern:*

Be it known that I, WILLIAM FRANCIS BEATTY, a citizen of the United States of America, and a resident of Laurel Hill, in the borough of Queens, county of Queens, and State of New York, have invented certain new and useful Improvements in Game-Boards, of which the following is a specification.

This invention relates to game-boards and more particularly to base-ball game apparatus in which are employed electric lamps to indicate the different positions of the players, and to make the game attractive to the participants.

The object of the invention is to provide an improved game-board in which the various plays are determined by chance and are then indicated by the lighting and putting out of lamps placed at the various positions usually occupied by the players.

For this purpose my invention consists of a game-board comprising a suitable supporting-board, a plurality of lamps thereon, means for closing a circuit through any of said lamps, and an indicator connected with said circuit-closing means.

Figure 5:
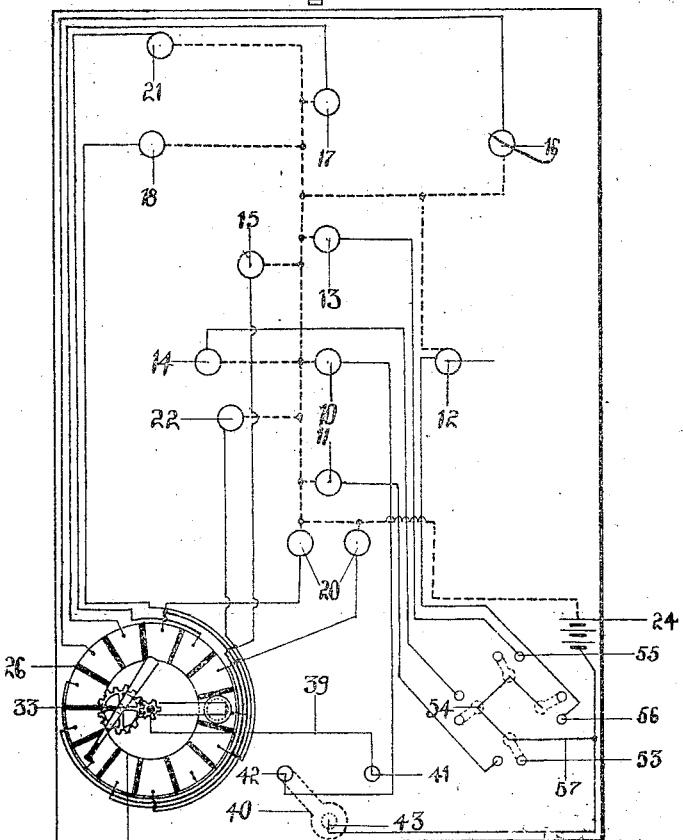
Figure 6:
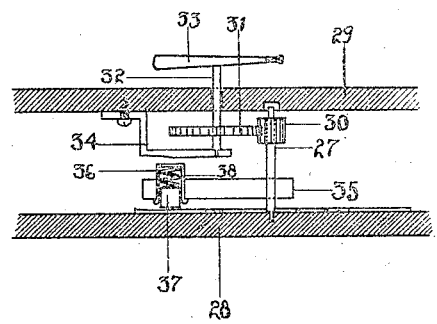

In the accompanying drawings, Figure 1 is a plan view of my improved game board, showing the field and the various positions of the players, as also the apparatus to carry out the various plays, Fig. 2 is a vertical section partly in elevation of a part of the device used to indicate the various plays, Fig. 3 is an enlarged front view of a part of the apparatus shown in Fig. 2, showing the finger for moving the dial, Fig. 4 is a side view of the finger shown in Fig. 3, Fig. 5 is a plan view of the game-board shown in Fig. 1 with the cover removed so as to show the electrical connections, and Fig. 6 is a view of a part of the device shown in Figs. 1 and 5, which sets by chance the parts in position for electrical connections to be made.

Similar reference characters indicate corresponding parts throughout the several figures of the drawings.

Referring to the drawings, Fig. 1 shows the usual field of the game of base-ball with circles indicating the various positions in the game, namely, pitcher being indicated by 10; batter by 11; first base by 12; second base by 13; third base by 14; shortstop by 15; right field by 16; center field by 17; left field by 18; and catcher by 20. Two circles are shown for the catcher, one to enable this position to indicate a strike and the other to indicate balls, while additional circles are provided, one 21 to indicate when a home run is made, and one 22 to indicate a foul ball. These different positions are also shown in Fig. 5 where the circles indicate electric incandescent lamps which project through corresponding openings of substantially the diameter of the circles in the top board 29. The lamps indicate, as stated, the various positions; these lamps have all one pole thereof connected with one pole of a source of electricity indicated by 24, which may be a battery or any other suitable supply. Each of the other poles of the incandescent lamps is connected with one bar by a commutator 25, which bars are insulated from each other by suitable material, as indicated by 26. In the center of this commutator a rotatable shaft 27 is provided which has its lower end bearing in the board 28 to which the commutator and the other electrical connections are applied, while its upper end is guided by the upper board 29. This shaft 27 is provided with a pinion 30 engaging a gear-wheel 31 secured to a rotatable shaft 32 to the upper end of which a bar 33 in the shape of a bat is provided, and which shaft extends beyond and above the top board 29 so as to enable the bat 33 to be manipulated by the players. The shaft 32 is supported in a bracket 34. To the shaft 27 a bar 35 is secured which supports a cap 36 in which a contact-piece 37 is guided, and compressed downwardly by means of a spring 38, the contact-piece 37 being adapted to pass freely without much friction over the various bars of the commutator 25. Thus by the spinning of the bat 33 the contact-piece 37 is moved over the various bars.

The particular bar on which the contact-piece rests depends upon the amount of force applied to the bat, as also the chance entering into the play. The shaft 27 is connected with a conductor 39 which is connected through a switch 40 with a pole of the battery or source of electricity indicated by 24. The switch 40 has its arm adapted to contact with the contact-point 41 and with the other contact-point 42. The switch 40 pivots at 43 and has a depending portion 44 having a pivoted member 45 with its upper end abutting against a pin 46 which enables the pivoted member 45 to be moved in only one direction. By this means the depending portion 44 when moved in one direction will engage with one of the projecting pins 47 of a dial 48 supported by a rotatable shaft 49 having its upper and lower ends in bearings of the top plate 29 and bottom plate 28, while the other movement of the depending portion 44 is possible without positively moving the dial by reason of the fact that the part 45 will readily move. The part 45 returns to its original position as shown in Fig. 4 by its own weight or by the assistance of springs, if such are found necessary. The dial 48 is provided at its upper face with eight different divisions, 81, 82, 83, 84, 85, 86, 87, 88, which are suitably marked, and which marks are visible through an opening 50 in the top board 29, the sight being assisted by an arrow 51. The top-plate 29 is also provided with an arc-shaped slot 52 to enable the depending portion of the switch 40 to be moved therein.

A set of switches is provided which consists of four switches, 53, 54, 55, 56, the pivot points of which are connected with a conductor 57 connected with one pole of the source of electricity. The free ends of these switches are adapted to make electrical connections with contact-points which are connected with certain of the lamps, namely, the home plate, third base, second base, and first base. The other lamps, indicating the catcher, the shortstop, the left, center, and right fielders, the foul, and the home run, have one of their terminals in electrical connection with one pole of the source of electricity, and each has its other terminal in electrical connection with one of the disks of the commutator 25. The top-plate shown in Fig. 1 is also provided at each side of the field with score cards 60 and 61 and also with an intermediate score card at the left hand side of the top-plate, which intermediate score card 67 is provided with movable indicating fingers 63, 64, 65 and 66, the indicating finger 63 being adapted to indicate the number of runs, the indicating finger 64 the number of strikes, the indicating finger 65 the number of balls, and the indicating finger 66 the number of outs taking place during certain periods of the game, the permanent scores being indicated on the score card 61 and 62.

The operation of my improved device is as follows: One player of the game operates the bat 33 by spinning it in one direction and he waits until the bat comes to rest. This play will put that lamp into connection which is connected with that particular commutator bar and by the subsequent lighting of the same will indicate by means thereof either the fact that a strike has been made, or a ball, by the lamps at 20, or a hit to short-stop, right-field, center-field or left-field, a foul ball, or a home run, by the lamps in these positions as before mentioned. The opposing player operates the switch 40 by throwing it from contact point 42 to contact point 41, closing thereby the electric circuit through that lamp connected with the bar of the commutator over which the movable contact face 37 rests. By the movement of switch 40 the dial 48 is rotated and when it stops that part underneath the opening 50 and indicated by the arrow 51 is read by the participants in the game. This may be either "thrown out on base", "three-base hit", "one-base hit", "out on fly", "two-base hit", or other suitable indication, eight divisions being shown in the drawing.

Supposing it to be a "one-base hit", then the switch 56 is operated by hand and thereby the light at the position 12 or first-base is caused to be illuminated, indicating that the runner is at that base. Similarly in case a "two-base hit" is made, the light at second base or at 13 is illuminated and stays lighted until it is extinguished. When the runner leaves the base, the light is extinguished by the player opening the proper switch.

When three men have been put out, the other player in the game then causes the bat 33 to rotate and the contact point 37 to rest on one of the commutator bars, whereupon the switch 40 is operated, and the switches 53, 54, 55 and 56 operated depending upon the play made by the dial 48, and the game continued in like manner as before.

When the commutator causes a foul ball to be indicated, that is causes the lamp 22 to be lighted, then no play of the indicator 48 is necessary. So also in case of a home run, being indicated by the illumination of the lamp 21. The rotation of the dial 48 may change the play made on the commutator, rendering such a play nugatory, as for instance, the commutator may bring about an electrical connection whereby left-field hit may be indicated by the illumination of the corresponding lamp while the dial 48 may show "out on fly" in which case the tally-hand 66 is moved by the player to show that the man has been put out.

Switch 40 when engaging contact 42 causes the lamp at the pitcher's box to remain lighted, thereby indicating that the apparatus is in condition for further play. When the apparatus is out of use, the switch 40 may stand between contacts 41 and 42, whereby all the lamps are cut out.

By my improved game-board the game of base-ball may be played by the operation of the different switches and the means used, namely the electric lamps, which designate the different plays, in such a manner as to greatly enhance the value of the game.

The game being entirely by chance, no one can foresee the various plays that are to be made, so that the game resembles very closely the actual game.

I have shown an embodiment of my invention, but it is clear that changes may be made therein without departing from the spirit and scope of the invention as defined in the accompanying claims.

Having thus described my invention, I claim as new and desire to secure by Letters Patent:

1. An improved game-board comprising a board having a plurality of lamps thereon, a source of electricity, conductors connecting the lamps with one pole of the source of electricity, a commutator plate, conductors connecting some of the lamps with the commutator plate, a plurality of switches, means connecting the switches with the source of the electricity, conductors connecting the other of the lamps with these switches, and means connecting those lamps in electrical connection with the commutator bars with the source of electricity for illuminating the same.

2. An improved game-board comprising a plurality of lamps adapted to indicate the different positions of the players, a commutator, means connecting some of the lamps with the commutator, a dial, a switch connecting the commutator with the source of electricity and means connected with the switch for operating the dial.

3. An improved game-board comprising a first set of lamps, a commutator-plate, a source of electricity, electrical connections between said source of electricity, said commutator-plate and said lamps, a second set of lamps, electrical connections between said source of electricity and said second set of lamps, and switches controlling said second set of lamps.

4. An improved game-board comprising a set of field lamps, a commutator-plate, a contact-piece movable upon the commutator-plate, a source of electricity, electrical connections between said source of electricity, said commutator-plate, said contact-piece, and said field lamps, a play-indicating dial, a set of diamond lamps, electrical connections between said source of electricity and said diamond lamps, and switches controlling said diamond lamps.

5. An improved game-board comprising a commutator-plate, a contact-piece, one of said parts being movable relatively to the other, position-indicating lamps, a source of electricity, and electrical connections between said commutator-plate, contact-piece, lamps, and source of electricity, for lighting the lamp in circuit with the contact-piece and commutator-plate.

6. An improved game-board comprising a commutator-plate, electrically-acting means connected therewith for indicating a first position of play, and a movable dial having indications of plays thereon, for indicating the play to be consummated upon said first position.

In testimony, that I claim the foregoing as my invention, I have signed my name in presence of two subscribing witnesses.

WILLIAM FRANCIS BEATTY.

Witnesses:
JOHN MURTAGH,
L. J. MURPHY.